Sept. 3, 1957 S. HAMMER 2,804,909
METHOD FOR FORMING SHEET MATERIAL
Filed June 23, 1954
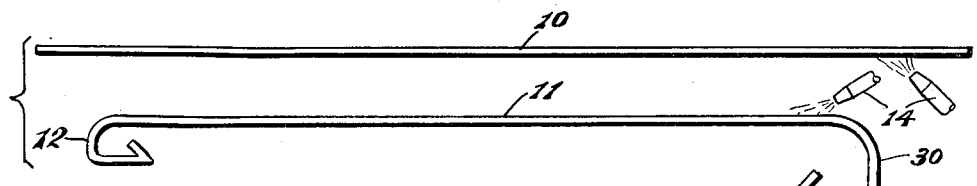
Fig. 1.
Fig. 2.
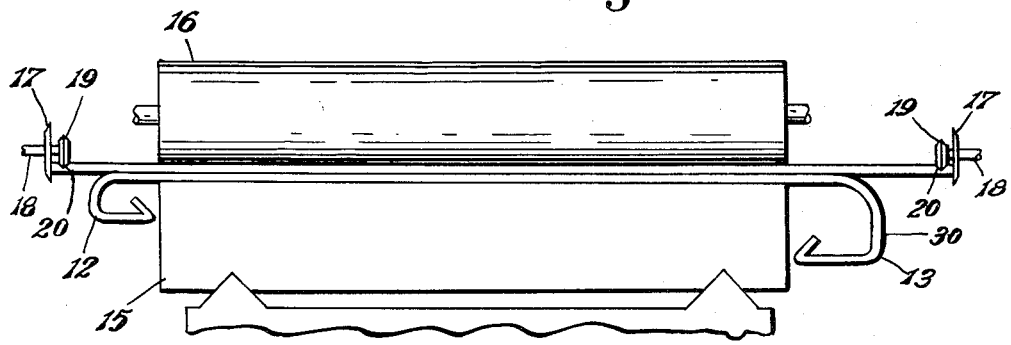
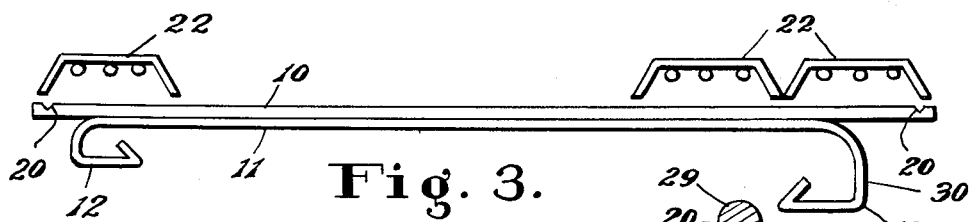
Fig. 3.
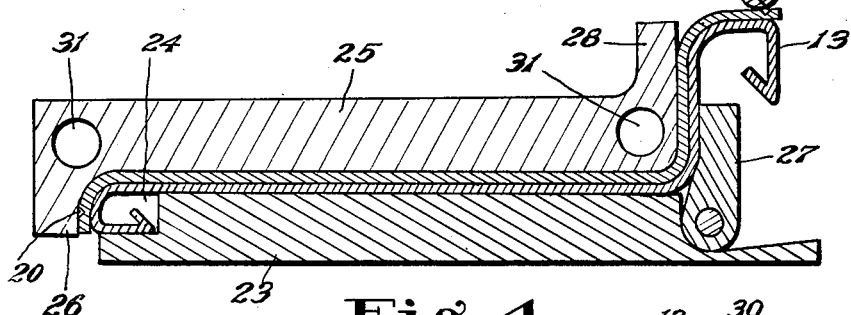
Fig. 4.
Fig. 5.
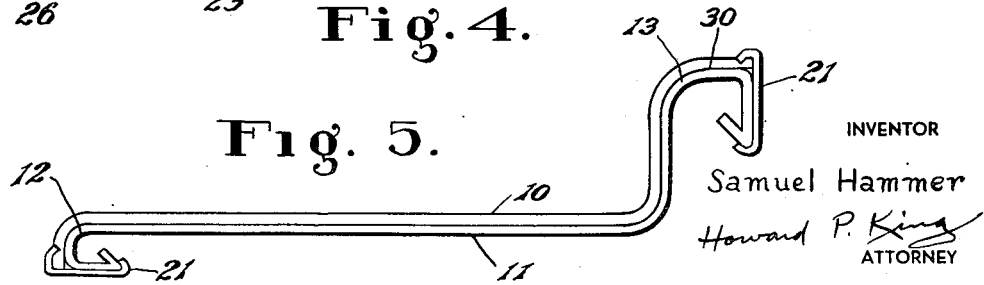
INVENTOR
Samuel Hammer
Howard P. King
ATTORNEY United States Patent Office 2,804,909
Patented Sept. 3, 1957

2,804,909

METHOD FOR FORMING SHEET MATERIAL

Samuel Hammer, New York, N. Y.

Application June 23, 1954, Serial No. 438,738

3 Claims. (Cl. 154—41)

This invention relates to a method for forming sheet material, and particularly a thermo-setting sheet material which in general comprises a suitable absorbent base sheet impregnated with a thermo-setting resin such as phenol, urea, or melamine formaldehyde resin, or furfural resin. The impregnation and curing are known in the art and require no explanation here further than to say that the sheets as cured heretofore are rigid and normally used in their flat condition. According to the present invention, post-forming operations are performed with respect to those rigid, flat sheets, for forming the same into articles having form-retaining shapes deviating from the original flat plane of the sheet stock. By way of example, the invention is herein explained as conforming and using the thermo-setting sheet material of the character above specified, and which is available on the market under trade names "Formica," "Panelite," "Micarta" and others, and post-forming the same to constitute a surfacing layer upon a steel body for sink and other cabinet tops and for other uses.

Heretofore efforts have been made to post-form and apply thermo-setting sheet material of the character above indicated, directly upon a base material and then, by use of dies, form both the surfacing material and the base material simultaneously to the ultimately desired shape. Alternatively, efforts have been made to separately and completely shape the surfacing material and the base and thereafter adhere one upon the other. In either of these methods, perfection of the dies and heating of the materials has injected an insurmountable obstacle and has proven to be unsatisfactory, with many rejects resulting due to buckling, mis-fit and inadequate adhesion.

In its broad aspect, the present invention contemplates overcoming the difficulties and imperfections encountered in prior practice.

Also of general character, the invention disclosed herein proposes progressive treatment of the surfacing material and the base both as to forming and as to adhesion for avoiding the draw-backs of prior art practice.

More specifically, the invention eliminates the need for expensive and accurately formed dies, and proposes a progressive formation and simultaneous adhesion of the surfacing material and base as formed.

A further object of the invention is to obtain a full surface contact of the surfacing material upon the base both on the plane areas and at the bends.

Yet another object of the invention is to definitely overcome and avoid buckling of the thermo-plastic surfacing material.

Other objects, advantages and novel features of the invention will appear to persons skilled in the art to which it appertains as the description proceeds, both by direct recitation thereof and by implication from the context.

Referring to the accompanying drawing wherein an arbitrarily selected article is shown formed by successive steps, and wherein like numerals of reference indicate similar parts both in progressive stages and in the finished article.

Figures 1 to 4 show the article in progressive stages of fabrication, Fig. 4 being a section looking in the same general direction in which the article is viewed in the other figures; and Figure 5 is a view also looking in the same direction, namely toward an end of the article, and showing the article in its complete form and with edging trim applied thereto.

In the specific embodiment of the invention illustrated in said drawing, the article comprises essentially a facing material 10 and a base 11 which in completely fabricated condition provides for the facing material to be juxtaposed throughout what will be termed its under surface in adhesive contact with what will be termed the upper surface of the base. The facing material to which the method is applied is initially a planar sheet of previously cured thermo-setting material of the character heretofore discussed. The base 11 arbitrarily selected for this description, is a sheet steel body appropriately hook-bent at its longitudinal or front and back margins in a roll bench as well known in the metal-shaping art. Accordingly, as shown in Fig. 1, the base has a reverse downward and inward curl 12 at its front edge, and a reverse downward and inward curl 13 at its rear edge.

According to the present invention the width of the facing material 10 is greater than the width from curl to curl of the base, and it may also be stated that said facing material, although preferably only fifty thousandths of an inch thick, is stiff and cannot be curved normally to follow the curls of the base. The entire under surface of the facing material, and the major portion of the upper surface of the base are flat at this initial stage of fabrication.

As a first step in my improved method, the entire under surface of the facing material 10 and the upper surface of the base, inclusive of that part of each curl to which the surface material is to be ultimately applied, are coated with an appropriate adhesive. This adhesive is in the general category of synthetic rubber-based cement available on the market, one having been successfully used and applied by spray guns 14 as indicated in Fig. 1. The applied thickness of this adhesive may approximate five one-thousandths of an inch, and in view of this small dimension no attempt has been made to illustrate its presence on the sheet and base other than the showing of its application by the spray guns. The adhesive will dry in air, but to avoid delay and to be assured of evaporation of the solvent present in the adhesive, the surfacing material 10 and the base 11 may be placed in a oven exposing the adhesive to a temperature of approximately 225° F. for a short time of say one and half to two minutes. The surfaces having the adhesive thereon, however, are not allowed to come in contact with each other at this stage.

The second step in my improved method is to place the backing or base member 11 flatwise and longitudinally upon a flat carriage 15, for which purpose the carriage of an ordinary planer serves very well. The curls of the base 11 are arranged to protrude beyond and hang down at the sides of said carriage so the flat intermediate portion of said base is supported in its entirety on the carriage. The face of the base on which the adhesive has been applied is directed upwardly. The sheet of facing material 10, with the adhesive on the under side, is then laid upon the base and with its wider side margins protruding beyond the sides of the base. The machine is provided with a roller 16 extending cross-wise of the carriage and as long as the carriage is wide, and applies pressure of approximately one hundred pounds to the square inch upon the assembled facing material and base as the carriage moves the assembly under the roller. This pressure, which is applied progressively from end to end of the assembly, obtains what will be termed a cold adhesion between the surfacing material and the base, although it will be understood that some energy of the pressure is transformed to heat and no doubt aids in effectuating the adhesion.

A third step in the method, which conveniently may be performed simultaneously with the above-described application of pressure, is trimming and grooving the surfacing material. For this purpose, at each side of the machine on which the rolling pressure is performed, I provide a cutter 17 properly located to trim the longitudinal edge of the material 10 to the required width thereof by which the trimmed edges will ultimately register with the downward-to-inward bend of the curl of the base 11, that condition being shown in Fig. 4. On the same shaft 18 with each trimming cutter 17 and inwardly thereof, is a grooving cutter 19 which will make a V-shaped groove 20 longitudinally of the trimmed edges in spaced proximity thereto for ultimately receiving the lip edge of a metal or other strip trim 21 as shown in Fig. 5. The trimming and grooving thus explained are performed progressively as the assembly of facing material and base pass the cutters during the transition of the said assembly effected by the longitudinal movement of the carriage.

Next, as a fourth step, the assembly is placed under appropriately located heaters 22 which extend the full length of the said assembly and located over the parts thereof that are to be bent. Said heaters may be of the radiant heat type and produce temperatures which will raise the affected portions of the assembly to a temperature of approximately 325° F. for substantially one minute. This temperature will suffice to render the facing material pliable and will also soften the intervening adhesive applied between the surfacing material and the base. While only the directly heated portions of the facing material are rendered pliable, the conduction will tend to soften all of the adhesive sufficiently that an applied force may obtain sliding of the facing material upon the base.

Immediately, and while the plastic and bendable conditions continue to prevail, the fifth step, illustrated in Fig. 4, is performed. The assembly is placed upon a table die 23 so constructed that the base will be prevented from sliding in a direction toward its rear edge, as by positioning the front curl in a rabbet 24 in said table. An upper die 25 is then brought down upon the facing member, said upper die having a front flange 26 with an appropriate inside curve. Said front flange engages the front margin of the facing material and bends it down into engagement with the front curl of the base. In this operation, the facing material may slide as conditions may require upon the base sufficient to assure tight engagement of the bend of the surfacing material tightly against the front curl of the base and at the same time the downward pressure of said upper die enforces tight contact of the plane portions of the elements.

In immediately following succession to the foregoing step of bending the front edge of the facing material and application of pressure to the planar portion of the assembly, the sixth step is performed, also illustrated by Fig. 4. This step obtains an upward bend of both the base and facing material to form the bib portion of the assembly. This bend is shown accomplished by an upwardly swinging die component 27 which cooperates with the rear end and upward brace 28 of the upper die to effect a curvature as well as upward projection of the elements thereat, with the softened adhesive admitting necessary sliding therebetween. The die component applies adequate pressure for positioning the said elements of the assembly tightly together. The extreme upper margin of the facing material which projects above the brace 28 and rear curl 13 is immediately rolled down, as with a roller 29 into engagement with the ledge portion 30 of the rear curl. Both due to the cooling effect of the atmosphere and artificial cooling which may be circulated through ducts 31 in the die, the temperature is lowered at least to 165° while the pressures are still applied, and the facing material and the adhesive will then both be set with the facing material tightly adhered throughout its entire under area in tight contact throughout with said base. Thereafter the dies are released and the trim applied completing the article as shown in Fig. 5.

I claim:

1. A method for forming sheet material, comprising applying adhesive to faces to be joined of elongated members of an ultimate assembly, one of said members constituting a base having a flat area and preformed curls at longitudinal edges thereof and the other being a flat sheet of thermo-setting facing material, applying adhesive to said faces, pressing the facing material into initial adhesive contact with said flat area of said base, progressively and longitudinally trimming said thermo-setting facing material simultaneously with said initial pressing thereof into contact with the base and thereby providing longitudinal edges for said facing material in exact parallelism to the curls of said base member, heating said members in the region of said curls and thereby partially releasing the adhesion between said members, and applying a pressure progressing laterally of said members from said flat area and toward and over the curl of said base member and thereby progressively bending the thermo-setting facing material into juxtaposition to said curls and sliding said faces upon each other to meet requirements of the bends, and thereafter effecting permanent adhesion between said members.

2. A method for forming sheet material, comprising applying adhesive to faces to be joined of elongated members of an ultimate assembly, one of said members constituting a base having a flat area and preformed curls at longitudinal edges thereof and the other being a flat sheet of thermo-setting facing material, applying adhesive to said faces, pressing the facing material into initial adhesive contact with said flat area of said base, progressively and longitudinally grooving said thermo-setting facing material simultaneously with said initial pressing thereof into contact with the base and thereby providing longitudinal grooves in said facing material in exact parallelism to the curls of said base member, heating said members in the region of said curls and thereby partially releasing the adhesion between said members, and applying a pressure progressing laterally of said members from said flat area and toward and over the curls of said base member and thereby progressively bending the thermo-setting facing material into juxtaposition to said curls and sliding said faces upon each other to meet requirements of the bends, and thereafter effecting permanent adhesion between said members.

3. A method for forming sheet material, comprising applying adhesive to faces to be joined of elongated members of an ultimate assembly, one of said members constituting a base having a flat area and preformed curls at longitudinal edges thereof and the other being a flat sheet of thermo-setting facing material, applying adhesive to said faces, pressing the facing material into initial adhesive contact with said flat area of said base, progressively and longitudinally trimming and grooving said thermo-setting facing material simultaneously with the said initial pressing thereof into contact with the base and thereby providing longitudinal edges for said facing material in exact parallelism to the curls of said base member and longitudinal grooves in said facing material also in exact parallelism to said curls of the base member, heating said members in the region of said curls and thereby partially releasing the adhesion between said members, and applying a pressure progressing laterally of said members from said flat area and toward and over the curl of said base member and thereby progressively bending the thermo-setting facing material into juxtaposition to said curls and sliding said faces upon each other to meet requirements of the bends, and thereafter effecting permanent adhesion between said members.

References Cited in the file of this patent

UNITED STATES PATENTS

| | | |
|---|---|---|
| 1,808,582 | Taylor | June 2, 1931 |
| 1,944,282 | Snyder | Jan. 23, 1934 |
| 1,993,082 | Blair et al. | Mar. 5, 1935 |
| 2,021,095 | Ball | Nov. 12, 1935 |
| 2,074,482 | Martens | Mar. 23, 1937 |
| 2,123,377 | Papp et al. | July 12, 1938 |
| 2,251,622 | Adams | Aug. 5, 1941 |
| 2,284,254 | Batcheller | May 26, 1942 |
| 2,293,184 | Weissert | Aug. 18, 1942 |
| 2,298,690 | Foerch et al. | Oct. 13, 1942 |
| 2,347,538 | Bloomberg | Apr. 25, 1944 |
| 2,482,981 | Kamrass | Sept. 27, 1949 |
| 2,487,631 | Anderson | Nov. 8, 1949 |
| 2,490,111 | Whitehead | Dec. 6, 1949 |
| 2,550,455 | Davies | Apr. 24, 1951 |
| 2,556,060 | Brinker | June 5, 1951 |
| 2,603,390 | Kaufman | July 15, 1952 |
| 2,648,370 | Beach | Aug. 11, 1953 |
| 2,661,789 | Keller | Dec. 8, 1953 |
| 2,682,491 | Hahn | June 29, 1954 |
| 2,714,571 | Irion et al. | Aug. 2, 1955 |
| 2,739,640 | Brinker et al. | Mar. 27, 1956 |

FOREIGN PATENTS

| | | |
|---|---|---|
| 371,344 | Great Britain | Apr. 18, 1932 |
| 572,680 | Germany | Mar. 20, 1933 |